United States Patent
Warakomski

(10) Patent No.: US 8,524,358 B2
(45) Date of Patent: Sep. 3, 2013

(54) CONFIGURATION OF MULTIPLE THERMOFORMABLE FILM LAYERS FOR RIGID PACKAGING REQUIRING MOISTURE AND OXYGEN PROTECTION

(75) Inventor: Steven J. Warakomski, Gordonsville, VA (US)

(73) Assignee: Klockner Pentaplast of America, Inc., Gordonsville, VA (US)

(*) Notice: Subject to any disclaimer, the term of this patent is extended or adjusted under 35 U.S.C. 154(b) by 441 days.

(21) Appl. No.: 12/939,835

(22) Filed: Nov. 4, 2010

(65) Prior Publication Data
US 2011/0104463 A1    May 5, 2011

Related U.S. Application Data

(60) Provisional application No. 61/257,948, filed on Nov. 4, 2009.

(51) Int. Cl.
*B32B 7/02*    (2006.01)
*B32B 27/08*   (2006.01)
*B32B 37/00*   (2006.01)
*B32B 38/00*   (2006.01)

(52) U.S. Cl.
USPC ... 428/215; 428/472; 156/308.2; 156/244.11; 156/242

(58) Field of Classification Search
USPC ............ 428/215, 422; 156/308.2, 244.11, 156/242
See application file for complete search history.

(56) References Cited

U.S. PATENT DOCUMENTS

| | | | |
|---|---|---|---|
| 6,749,940 B1 | 6/2004 | Terasaki et al. | |
| 2004/0197567 A1* | 10/2004 | Tsai et al. | 428/421 |
| 2006/0222845 A1 | 10/2006 | Deng et al. | |
| 2006/0283758 A1* | 12/2006 | Pasbrig | 206/531 |
| 2008/0261050 A1* | 10/2008 | Hartzel et al. | 428/421 |
| 2008/0269701 A1* | 10/2008 | Dircks et al. | 604/333 |
| 2009/0208718 A1* | 8/2009 | Stoll et al. | 428/220 |
| 2011/0073901 A1* | 3/2011 | Fujita et al. | 257/100 |

FOREIGN PATENT DOCUMENTS
EP     1709116 B1    5/2009

OTHER PUBLICATIONS

International Search Report mailed Jul. 25, 2011 in connection with PCT/US 10/055498.

* cited by examiner

*Primary Examiner* — David Sample
*Assistant Examiner* — Tahseen N Khan
(74) *Attorney, Agent, or Firm* — McGuireWoods LLP

(57) ABSTRACT

A four-layer film for packaging, including blister packaging, is described. Layer 1 may be a rigid film, such as a polyvinyl chloride (PVC) or polyester. Layer 2 may be a moisture barrier, such as polychlorotrifluoroethylene (PCTFE). Layer 3 may be an oxygen barrier, such as a co-extruded film having a polyethylene (PE) layer, an EVOH layer, and a second PE layer. Layer 4 may be a relatively thin layer of a rigid film, such as a PVC or polyester. In this arrangement, Layer 2 may protect the contents of the package from external or atmospheric moisture. Layer 2 may also protect Layer 3 from atmospheric moisture, thereby helping to preserve the effectiveness of Layer 3 as an oxygen barrier.

20 Claims, 2 Drawing Sheets

CONFIGURATION OF MULTIPLE THERMOFORMABLE FILM LAYERS FOR RIGID PACKAGING REQUIRING MOISTURE AND OXYGEN PROTECTION

REFERENCE TO RELATED APPLICATIONS

This application claims priority to U.S. Provisional Application No. 61/257,948, filed Nov. 4, 2009, and hereby incorporates by reference all subject matter disclosed therein.

BACKGROUND

1. Field of the Present Disclosure

The present disclosure is directed to a method for forming a rigid packaging of multiple thermoformable layers and the packaging made thereby. The packaging may have improved visual consistency and clarity. The packaging may also provide high moisture and oxygen protection.

2. Related Art

Many industries rely on packaging using films, such as blister packaging, as a common method to protect their products. Blister packages typically consist of a rigid thermoformed component, which is made of a polymer, and a flexible lid, which typically contains aluminum as one its main components. To protect the product against moisture and oxygen, the thermoformed component or film used in blister packages often relies on multiple layers of different types of polymers. For example, products that require protection from oxygen frequently utilize a film made from ethylene vinyl alcohol copolymer (EVOH), which acts as a barrier to diffusion of oxygen across the thermoformed film of the blister package. However, a common deficiency associated with the use of EVOH polymer exists. As it is exposed to moisture and its relative humidity increases, the diffusion of oxygen through the EVOH increases. Thus its effectiveness as a barrier to oxygen is reduced.

In addition, films made from multiple layers of different polymers suffer from reduced light transmission. This results in increased haze, poor visibility, and similar difficulties viewing the product contained in the blister package.

Accordingly, there is a need for a rigid package that both provides high oxygen and/or moisture protection and possesses improved visual consistency and clarity.

SUMMARY

The present disclosure meets the foregoing need and allows for the production of blister packaging that has high oxygen and moisture protection, as well as improved visual clarity and other advantages apparent from the discussion herein.

In particular, the specific orientation of the individual polymer layers relative to each other within the film structure may provide the desired effect of maximizing oxygen barrier by minimizing the relative humidity of the EVOH layer of firm. This effect may be accomplished by situating, within the multiple film structure, the EVOH film layer as close to the dry side of the package as possible and maximizing the moisture barrier between the EVOH layer and the wet side of the package.

This arrangement may satisfy the need for visual consistency and improved clarity by properly selecting the orientation of the individual surfaces of each layer within the lamination. Use of calendering technology for the product contact film layer within the total laminate structure permits adjustment and selection of the film gloss level specific to the individual side of the layer. The product contact layer may be manufactured with a high and low gloss side. By laminating the EVOH layer to the high gloss side of the relatively thin contact layer, the bond strength between these two layers may improve and, visually, the film may possess a more uniform appearance. This appearance may hide minor imperfections in the polymer films and adhesives used within the total structure.

Selection of the proper base layer remains critical in order to perform successfully on unsupported web form-fill-seal equipment. This type of equipment exists as a common standard in many areas of the packaging industry. Selection of the proper polymer type and thickness may allow the present disclosure to thermoform at an acceptable range of processing temperatures and may also permit the present disclosure to hold an acceptable level of alignment and registration through the various stations and operations common to this type of automated packaging equipment.

Accordingly, in one aspect of the present disclosure, a film includes four layers. The first layer is polyvinyl chloride or polyester or both, and the second layer is polychlorotrifluoroethylene. The third layer includes a first sublayer essentially of polyethylene, a second sublayer essentially of ethylene vinyl alcohol copolymer, and a third sublayer essentially of polyethylene. The fourth layer is polyvinyl chloride or polyester and has a higher gloss side and a lower gloss side.

The first layer may provide at least 25% and no more than 50% of the total thickness of the film. The first layer may be 127 microns±5% thick, i.e. from 120.65 to 133.35 microns thick. The second layer may be 102 microns±15% thick, i.e. from 86.7 to 117.3 microns thick. The third layer may be 51 microns±15% thick, i.e. from 43.35 to 58.65 microns thick. The fourth layer may be 60 microns±10% thick, i.e. from 54 to 66 microns thick. The third layer may be a co-extruded film, and the fourth layer may be a calendered film. The higher gloss side of the fourth layer may be from 27 to 77 gloss units glossier than the lower gloss side. The higher gloss may be oriented toward the third layer.

According to another aspect of the present disclosure, a method of making a film includes providing a first layer of polyvinyl chloride, polyester, car both. The method further includes attaching a second layer of polychlorotrifluoroethylene to the first layer, attaching a third layer to the second layer, and attaching a forth layer of polyvinyl chloride or polyester both to the third layer. The third layer includes a first sublayer essentially of polyethylene, a second sublayer essentially of ethylene vinyl alcohol copolymer, and a third sublayer essentially of polyethylene. The fourth layer has a higher gloss side and a lower gloss side.

The first layer may provide at least 25% and no more than 50% of the total thickness of the film. The first layer may be 127 microns±5% thick, i.e. from 120.65 to 133.35 microns thick. The second layer may be 102 microns±15% thick, i.e. from 86.7 to 117.3 microns thick. The third layer may be 51 microns±15% thick, i.e. from 43.35 to 58.65 microns thick. The fourth layer may be 60 microns±10% thick, i.e. from 54 to 66 microns thick. The higher gloss side of the fourth layer may be from 27 to 77 gloss units glossier than the lower gloss side. The higher gloss may be oriented toward the third layer.

The method may also include forming the third layer by co-extrusion and/or forming the fourth layer by calendering. Forming the fourth layer may include contacting the higher gloss side of the fourth layer with a hotter calender roll and contacting the lower gloss side of the fourth layer with a cooler calender roll. The hotter calender roll may be the last roll to contact the higher gloss side, and the cooler calender roll may be the last roll to contact the lower gloss side. The hotter calendar roll may be between 18° C. and 32° C. hotter than the cooler calender roll.

In yet another aspect of the present disclosure, a film includes three layers. The first layer is essentially polyvinyl chloride or polyester or both. The second layer is essentially poly-chlorotrifluoroethylene. The third layer includes a first sublayer of essentially polyethylene, a second sublayer of essentially ethylene vinyl alcohol copolymer, and a third sublayer of essentially polyethylene.

The first layer may be 127 microns±5% thick, i.e. from 120.65 to 133.35 microns thick. The second layer may be 102 microns±15% thick, i.e. from 86.7 to 117.3 microns thick. The third layer may be 51 microns±15% thick, i.e. from 43.35 to 58.65 microns thick. The fourth layer may be 60 microns±10% thick, i.e. from 54 to 66 microns hick.

Additional features, advantages, and embodiments of the present disclosure may be set forth or apparent from consideration of the following detailed description, drawings, and claims. Moreover, it is to be understood that both the foregoing summary of the present disclosure and the following detailed description are exemplary and intended to provide further explanation without limiting the scope of the present disclosure as claimed.

BRIEF DESCRIPTION OF THE DRAWINGS

The accompanying drawings, which are included to provide a further understanding of the present disclosure, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced. In the drawings.

DETAILED DESCRIPTION

Figure 1:
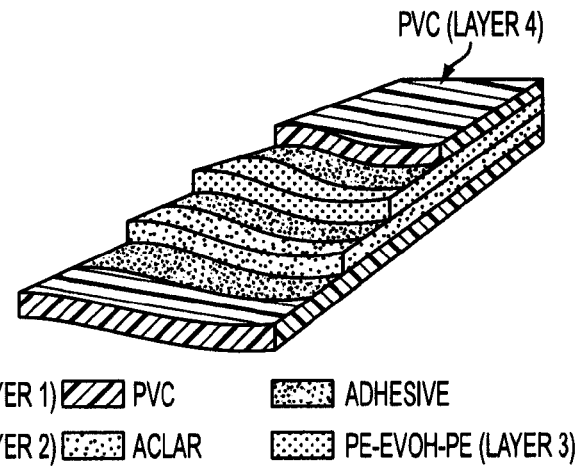
FIG. 1 shows the layers of a package film constructed according to the present disclosure.

The embodiments of the present disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the present disclosure may be practiced and to further enable those of skill in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings.

Figure 2:
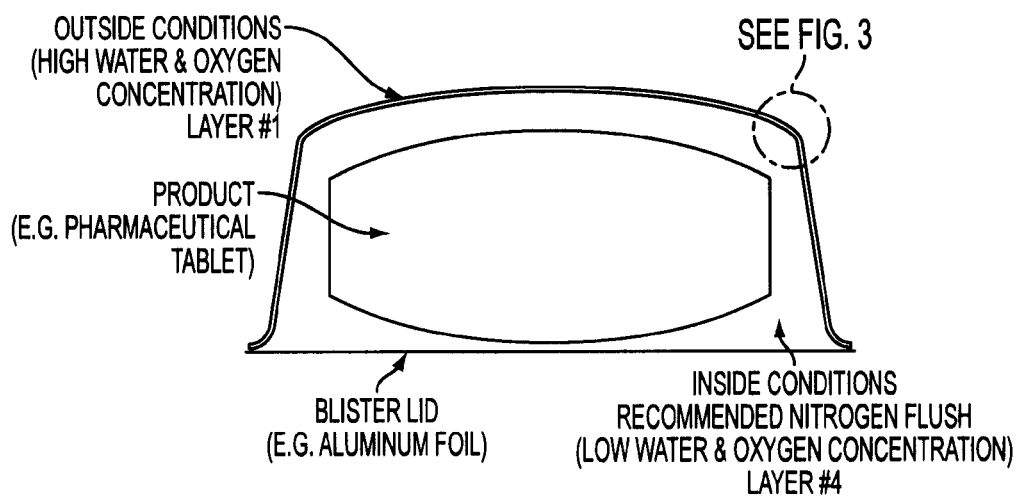
FIG. 2 shows the structure of the package film, including layers.

To produce packaging using films, such as blister packaging, that has high oxygen and moisture protection, as well as improved visual clarity, a four-layer film may be provided, as shown in FIG. 1 and described in detail below. The film may be used to form a blister cavity in a blister package, shown in FIG. 2. In particular, the cavity may contain a product that is susceptible to degradation by moisture and/or oxygen, such as, e.g., a pharmaceutical tablet. The cavity may be formed by any means known in the art. Once the cavity is formed, the product is placed in the cavity, and the cavity is sealed with a lid. The lid is preferably impermeable to oxygen and moisture and may be made from any appropriate material as will be understood by one skilled in the art. For example, the lid may be made from aluminum foil. Prior to sealing, the cavity may be flushed with a gas that is relatively inert, such as, e.g., nitrogen. Flushing the cavity in this manner lowers the amount of oxygen and moisture that is in contact with the product.

Other uses and applications of the film are possible without departing from the spirit and scope of the present disclosure. Films produced according to the present disclosure could be used, e.g. to form clamshell-type packages or other types of retail packages.

Figure 3:
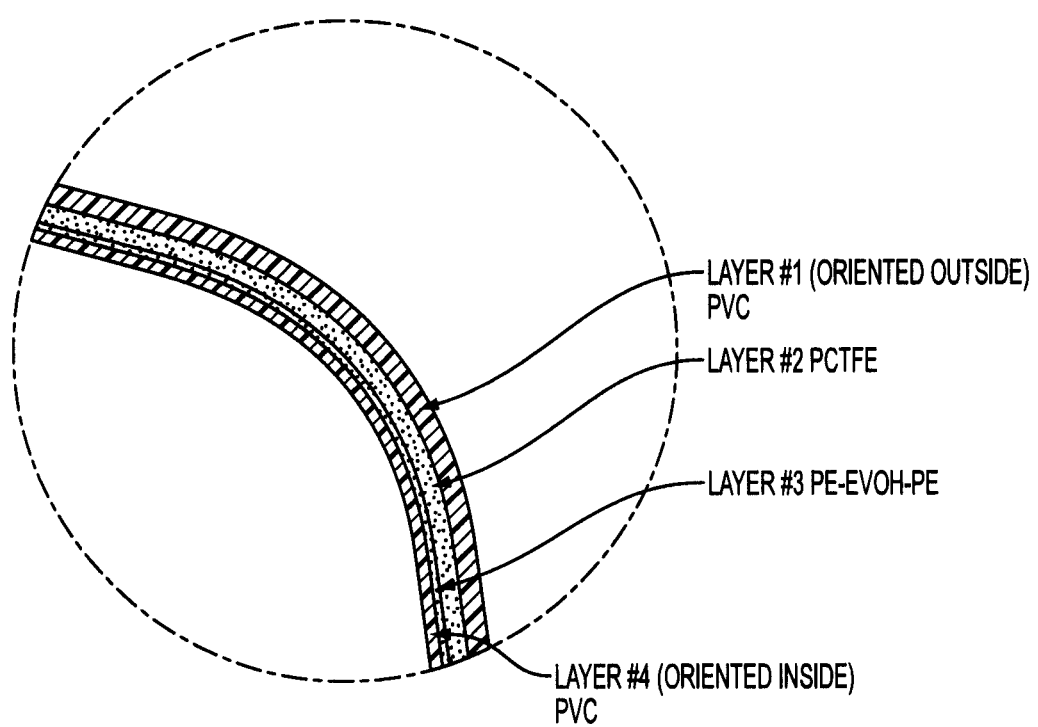
FIG. 3 shows a magnified view of the layers shown in FIG. 2.

As shown in FIGS. 1 and 3, the thermoformable film may have four layers. Additional layers may be included and are accordingly contemplated. Layer 1 may be oriented to the outside of the packaging, i.e. exposed directly to the ambient atmosphere, and acts as a base layer for the film. Layer 1 may be a rigid film, such as, e.g., a polyvinyl chloride (PVC) or polyester. Other rigid films are contemplated and are within the scope of the present disclosure. Layer 1 may be, for example, from 25% to 50% of the overall thickness of the film. As a rigid and relatively thick base layer, Layer 1 provides the dimensional stability and strength necessary to process a thermoformable film on unsupported form-fill-seal equipment common to the blister packaging industry.

Layer 2 may be a moisture barrier, such as, e.g., polychlorotrifluoroethylene (PCTFE), and Layer 3 may be an oxygen barrier, such as, e.g., a co-extruded film having a polyethylene (PE) layer, an EVOH layer, and a second PE layer. When the packaging film is constructed in this manner, Layer 2 may protect the contents of the package from external or atmospheric moisture. Layer 2 may also protect Layer 3 from atmospheric moisture, thereby helping to preserve the effectiveness of Layer 3 as an oxygen barrier.

Layer 4 may be a relatively thin layer of a rigid film, such as, e.g., a PVC or polyester. Layer 4 may help to protect Layer 3 from atmospheric moisture prior to flushing the package, from atmospheric moisture in an unflushed cavity, or from residual moisture in a flushed cavity. In this manner, Layer 4 may also help to preserve the oxygen-barrier properties of Layer 3. Furthermore, Layer 4 may provide a relative high diffusion across just Layer 4 itself. When flushing the inside of the package, for example, this high diffusion rate may help keep Layer 3 dry and at or close to 0% relative humidity. Low humidity in Layer 3, in turn, may help to preserve its oxygen-barrier properties. It is noted that the above-described layers may also be arranged differently within the scope and spirit of the present disclosure. For example, Layer 4 may be omitted entirely.

In one aspect of the present disclosure, the target absolute thicknesses may be 127 microns (±5%) for Layer 1, 102 microns (±15%) for Layer 2, 51 microns (±15%) for Layer 3, and 60 microns (±10%) for Layer 4. Other thicknesses of the layers are contemplated and within the scope of the present disclosure. According to a different aspect of the present disclosure, Layer 1 target thickness, for example, may range from 127 to 508 microns, Layer 2 from 15 to 152 microns, Layer 3 from 25 to 76 microns, and Layer 4 from 15 to 76 microns. According to an aspect of the present disclosure, Layer 4 may be 20% or less of the overall thickness, although layer 4 may be greater than 20% of the overall thickness in alternate aspects. In general, the four layers must be chosen to perform their intended functions in relation to each other, and as one skilled in the art will appreciate, the example values provided here typically satisfy that requirement.

Manufacture of the individual layers may utilize the technologies of calendering, extrusion, and co-extrusion, as will be understood by one skilled in the art. For example, Layer 1 may be either a calendered film or an extruded rigid film, Layer 2 may be a mono-extrusion, Layer 3 may be an A/B/A co-extrusion, and Layer 4 may be a calendered film. Other manufacturing arrangements are contemplated and within the scope of the present disclosure. Manufacture of the multiple layer film itself may rely on a lamination process that utilizes a water-based, curable, polyurethane adhesive to combine the individual film layers into the film structure. More specifically, manufacture of the film may involve three lamination steps. The first lamination step attaches Layer 2 to Layer 1, the second lamination step attaches Layer 3 to Layer 2, and the third lamination step attaches Layer 4 to Layer 3. Additional steps are contemplated and are within the scope and spirit of the disclosure.

As part of the third lamination step, gloss levels of layer 4 may be specified and properly oriented. For example, Layer 4 may be calendered under conditions to achieve a significant difference in the gloss level from one side of the film compared to the other. Differences measured with a gloss meter at an angle of 20° will range from approximately 30 to 70 gloss units. This difference in gloss levels may be achieved by running the last calender roll to contact each side at different temperatures. For example, the last roll on the high-gloss side may operate approximately 20-30° C. hotter than the last roll on the low-gloss side. Other conditions and arrangements are possible, as will be understood by one skilled in the art. The high-gloss side of Layer 4 may be laminated to Layer 3. This processing technique results in improved visual consistency and clarity. The resulting visual qualities are on par with laminations having fewer layers. This improvement has been measured and confirmed using a haze meter.

EXAMPLES

To quantify and benchmark the visual consistency of the film, two separate examples were manufactured. Example 1 was produced as described above except that the low-gloss side of Layer 4 was laminated to Layer 3. Example 2 was produced as described above, i.e. the high-gloss side of Layer 4 was laminated to Layer 3. The examples were measured on a haze meter.

Haze is defined as the percentage of light passing through the film sample that deviates from the incident beam by more than 2.5°. Example 1 resulted in haze value of 7.5%, and Example 2 resulted in a haze value of 16%. The higher haze value indicates more light disruption, which results in a more uniform appearance that hides imperfections present in the individual layers of polymers and adhesives.

While the present disclosure has been described in terms of exemplary embodiments, those skilled in the art recognize that the present disclosure can be practiced with modifications in the spirit and scope of the appended claims. These examples given above are merely illustrative and are not meant to be an exhaustive list of all possible designs, embodiments, applications or modifications of the present disclosure.

What is claimed is:

1. A film comprising:
   a first layer consisting essentially of at least one of polyvinyl chloride and polyester;
   a second layer consisting essentially of polychlorotrifluoroethylene;
   a third layer comprising
      a first sublayer consisting essentially of polyethylene,
      a second sublayer consisting essentially of ethylene vinyl alcohol copolymer, and
      a third sublayer consisting essentially of polyethylene; and
   a fourth layer consisting essentially of at least one of polyvinyl chloride and polyester, the fourth layer comprising a higher gloss side and a lower gloss side.

2. The film of claim 1, wherein the first layer provides at east 25% and no more than 50% of a total thickness of the film.

3. The film of claim 1, wherein the first layer is 127 microns±5% thick, the second layer is 102 microns±15% thick, the third layer is 51 microns±15% thick, and the fourth layer is 60 microns±10% thick.

4. The film of claim 1, wherein the third layer is a coextruded film.

5. The film of claim 1, wherein the fourth layer is a calendered film.

6. The film of claim 1, wherein the higher gloss side of the fourth layer is 27 to 77 gloss units glossier than the lower gloss side of the fourth layer.

7. The film of claim 1, wherein the higher gloss side of the fourth layer is oriented toward the third layer.

8. A method of making a film comprising:
   providing a first layer consisting essentially of at least one of polyvinyl chloride and polyester;
   attaching a second layer consisting essentially of polychlorotrifluoroethylene to the first layer;
   attaching a third layer to the second layer, the third layer comprising
      a first sublayer consisting essentially of polyethylene,
      a second sublayer consisting essentially of ethylene vinyl alcohol copolymer, and
      a third sublayer consisting essentially of polyethylene; and
   attaching a fourth layer to the third layer, the fourth layer consisting essentially of at least one of polyvinyl chloride and polyester, the fourth layer comprising a higher gloss side and a lower gloss side.

9. The method of claim 8, wherein the first layer provides at least 25% and no more than 50% of a total thickness of the film.

10. The method of claim 8, wherein the first layer is 127 microns±5% thick, the second layer is 102 microns±15% thick, the third layer is 51 microns±15% thick, and the fourth layer is 60 microns±10% thick.

11. The method of claim 8, further comprising forming the third layer by co-extrusion.

12. The method of claim 8, further comprising forming the fourth layer by calendering.

13. The method of claim 8, wherein the higher gloss side of the fourth layer is 27 to 77 gloss units glossier than the lower gloss side of the fourth layer.

14. The method of claim 8, wherein the higher gloss side of the fourth layer is oriented toward the third layer.

15. The method of claim 12, further comprising
contacting the higher gloss side of the fourth layer with a hotter calender roll; and
contacting the lower gloss side of the fourth layer with a cooler calender roll.

16. The method of claim 15, wherein the hotter calendar roll is a final roll to contact the higher gloss side.

17. The method of claim 15, wherein the cooler calendar roll is a final roll to contact the lower gloss side.

18. The method of claim 15, wherein the hotter calendar roll is at least 18° C. and no more than 32° C. hotter than the cooler calender roll.

19. A film comprising:
a first layer of consisting essentially of at least one of polyvinyl chloride and polyester;
a second layer consisting essentially of polychlorotrifluoroethylene;
a third layer comprising
a first sublayer consisting essentially of polyethylene,
a second sublayer consisting essentially of ethylene vinyl alcohol copolymer, and
a third sublayer consisting essentially of polyethylene.

20. The film of claim 19, wherein the first layer is 127 microns±5% thick, the second layer is 102 microns±15% thick, the third layer is 51 microns±15% thick, and the fourth layer is 60 microns±10% thick.

* * * * *